United States Patent
Kim

(10) Patent No.: US 11,939,016 B2
(45) Date of Patent: Mar. 26, 2024

(54) SYSTEM AND METHOD FOR ASSEMBLING INSIDE MIRROR FOR VEHICLE

(71) Applicants: Hyundai Motor Company, Seoul (KR); Kia Corporation, Seoul (KR)

(72) Inventor: Sung Jong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 3 days.

(21) Appl. No.: 17/975,738

(22) Filed: Oct. 28, 2022

(65) Prior Publication Data

US 2023/0202593 A1 Jun. 29, 2023

(30) Foreign Application Priority Data

Dec. 27, 2021 (KR) .................. 10-2021-0188577

(51) Int. Cl.
  *B62D 65/14* (2006.01)
  *B62D 65/06* (2006.01)
(52) U.S. Cl.
  CPC ............. *B62D 65/14* (2013.01); *B62D 65/06* (2013.01)
(58) Field of Classification Search
  CPC . B60R 1/04; B62D 65/14; B62D 65/06; B25J 15/00
  USPC ........................................................... 29/714
  See application file for complete search history.

(56) References Cited

U.S. PATENT DOCUMENTS

2016/0151919 A1* 6/2016 Yeum ................ B25J 15/009
                                                     294/213

FOREIGN PATENT DOCUMENTS

KR    10-2015-0130024 A    11/2015

* cited by examiner

*Primary Examiner* — Rick K Chang
(74) *Attorney, Agent, or Firm* — Fox Rothschild LLP

(57) ABSTRACT

The present disclosure relates to a system for assembling an inside mirror for a vehicle, the system including a plurality of robots each having at least one of a vision measurement unit, a fastening unit, and a gripper configured to grip an inside mirror for a vehicle, and a control unit configured to control the plurality of robots to measure a first mounting surface of a windshield glass and a second mounting surface of the inside mirror, move the inside mirror so that the first and second mounting surfaces are attached to each other while overlapping each other, and fasten the inside mirror and the windshield glass in a state in which the first and second mounting surfaces are attached to each other.

11 Claims, 7 Drawing Sheets

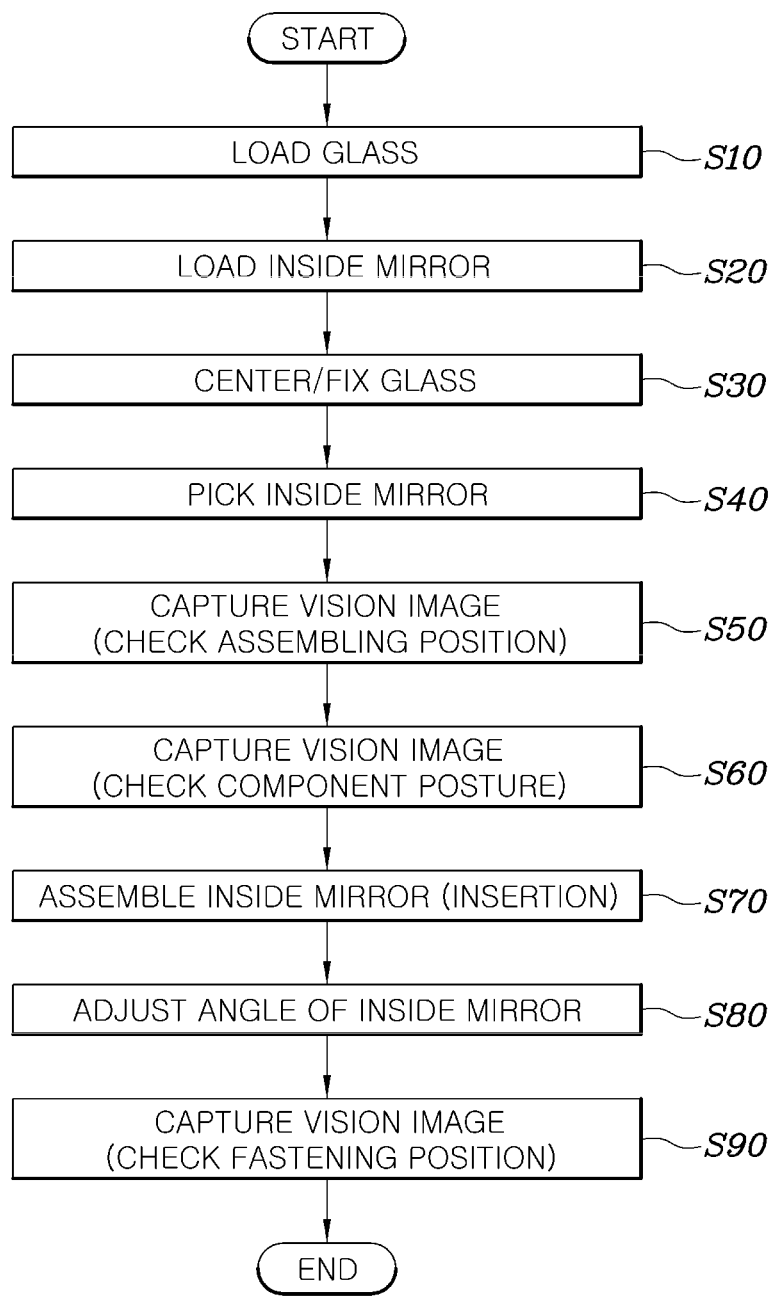

SYSTEM AND METHOD FOR ASSEMBLING INSIDE MIRROR FOR VEHICLE

CROSS-REFERENCE TO RELATED APPLICATION

The present application claims under 35 U.S.C. § 119(a) the benefit of Korean Patent Application No. 10-2021-0188577, filed Dec. 27, 2021, the entire contents of which is incorporated herein for all purposes by this reference.

FIELD OF THE DISCLOSURE

Embodiments of the present disclosure relate to a system and method for assembling an inside mirror for a vehicle, and more particularly, to a system and method for assembling an inside mirror for a vehicle that automate a process of assembling an inside mirror by developing a fastening tool used in a narrow space and compensating for an assembling position of a robot by measuring assembling postures of atypical components of a windshield glass and the inside mirror, thereby improving work organization efficiency and process management efficiency, solving a problem of non-uniformity of an assembling method depending on manual operations, and ensuring uniform component assembling quality.

DESCRIPTION OF THE RELATED ART

In general, an inside mirror (also called a room mirror) for a vehicle is used to ensure visual fields toward a rear seat and a rear side of the vehicle. The inside mirror is mounted on a ceiling surface and disposed above a boundary between a driver seat and a passenger seat so that an angle of the inside mirror is adjustable.

In the related art, the inside mirror is assembled to a windshield glass by fitting a base of the inside mirror into a base of the windshield glass and fastening and fixing the inside mirror to the windshield glass by means of screws. Because the inside mirror and the windshield glass are atypical components, the inside mirror and the windshield glass need to be assembled manually.

The manual operation of assembling the inside mirror is lower in work organization efficiency than a main line, and the inside mirror has an atypical shape due to angles of two pivots. For this reason, it is difficult to apply a simple pick-and-place assembling method using a robot in the related art. In addition, because an entry section of a fastening tool is as narrow as at least 18 mm, it is difficult to use the tool used for the manual operation in the current space.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

As discussed, the method and system suitably include use of a controller or processer.

The present disclosure is proposed to solve these problems and aims to provide a system and method for assembling an inside mirror for a vehicle that automate a process of assembling an inside mirror by developing a fastening tool used in a narrow space and compensating for an assembling position of a robot by measuring assembling postures of atypical components of a windshield glass and the inside mirror, thereby improving work organization efficiency and process management efficiency, solving a problem of non-uniformity of an assembling method depending on manual operations, and ensuring uniform component assembling quality.

To achieve the above-mentioned object, the present disclosure provides a system for assembling an inside mirror for a vehicle, the system including: a plurality of robots each having at least one of a vision measurement unit, a fastening unit, and a gripper configured to grip an inside mirror for a vehicle; and a control unit configured to control the plurality of robots to measure a first mounting surface of a windshield glass and a second mounting surface of the inside mirror, move the inside mirror so that the first and second mounting surfaces are attached to each other while overlapping each other, and fasten the inside mirror and the windshield glass in a state in which the first and second mounting surfaces are attached to each other.

The plurality of robots may include: a first robot having an end at which the gripper configured to grip the inside mirror for a vehicle is provided; and a second robot having an end at which the vision measurement unit and the fastening unit are provided.

The first robot may have a shape of a standard articulated robot, and the second robot may have a shape of a shelf-mounted articulated robot.

The fastening unit and the gripper may be designed to be rotatable. The fastening unit may be rotatable by a drive motor.

The control unit may be configured to measure measurement information including entry routes, entry angles, and entry directions of the first and second mounting surfaces.

The control unit may be configured to compensate for the entry routes, the entry angles, and the entry directions of the first and second mounting surfaces on the basis of the measurement information.

The fastening unit may be configured to fasten the first and the second mounting surfaces while compensating for the entry routes, the entry angles, and the entry directions of the first and second mounting surfaces on the basis of the measurement information.

The control unit may be configured to adjust an angle of the inside mirror so that the inside mirror and the windshield glass are parallel to each other when the first and second mounting surfaces are attached to each other.

The system may further include: a working stage having a unit configured to support the windshield glass, align components, and fix the components, and the control unit may be configured to control the plurality of robots above the working stage and measure the first mounting surface of the windshield glass and the second mounting surface of the inside mirror.

The gripper may be provided on an upper portion of a multi-tool mount unit and/or includes three pneumatic grippers and one magnetic gripper.

To achieve the above-mentioned object, the present disclosure provides a method of assembling an inside mirror for a vehicle, the method including: measuring a first mounting surface of a windshield glass and a second mounting surface of an inside mirror; assembling the inside mirror so that the first and second mounting surfaces are attached to each other while overlapping each other; and performing control to fasten the inside mirror and the windshield glass in a state in which the first and second mounting surfaces are attached to each other.

The measuring of the first mounting surface of the windshield glass and the second mounting surface of the inside mirror may include measuring measurement information including entry routes, entry angles, and entry directions of the first and second mounting surfaces.

The method may further include disposing the windshield glass on a working stage to support the windshield glass before the measuring of the first mounting surface of the windshield glass and the second mounting surface of the inside mirror.

The method may further include fixing the windshield glass and gripping the inside mirror after the disposing of the windshield glass.

The method may further include compensating for the entry routes, the entry angles, and the entry directions of the first and second mounting surfaces after the assembling of the inside mirror.

The method may further include adjusting an angle of the inside mirror so that the inside mirror and the windshield glass are parallel to each other after the assembling of the inside mirror.

According to the system and method for assembling an inside mirror for a vehicle according to the present disclosure, it is possible to automate the process of assembling the inside mirror by developing the fastening tool used in a narrow space and compensating for the assembling position of the robot by measuring the assembling postures of the atypical components of the windshield glass and the inside mirror, thereby improving work organization efficiency and process management efficiency, solving a problem of non-uniformity of an assembling method depending on manual operations, and ensuring uniform component assembling quality.

The effects obtained by the present disclosure are not limited to the aforementioned effects, and other effects, which are not mentioned above, will be clearly understood by those skilled in the art from the following description.

BRIEF DESCRIPTION OF THE DRAWINGS

FIG. 7 is a flowchart illustrating a method of managing the system for assembling an inside mirror for a vehicle illustrated in FIG. 1.

DETAILED DESCRIPTION OF THE DISCLOSURE

Figure 1:
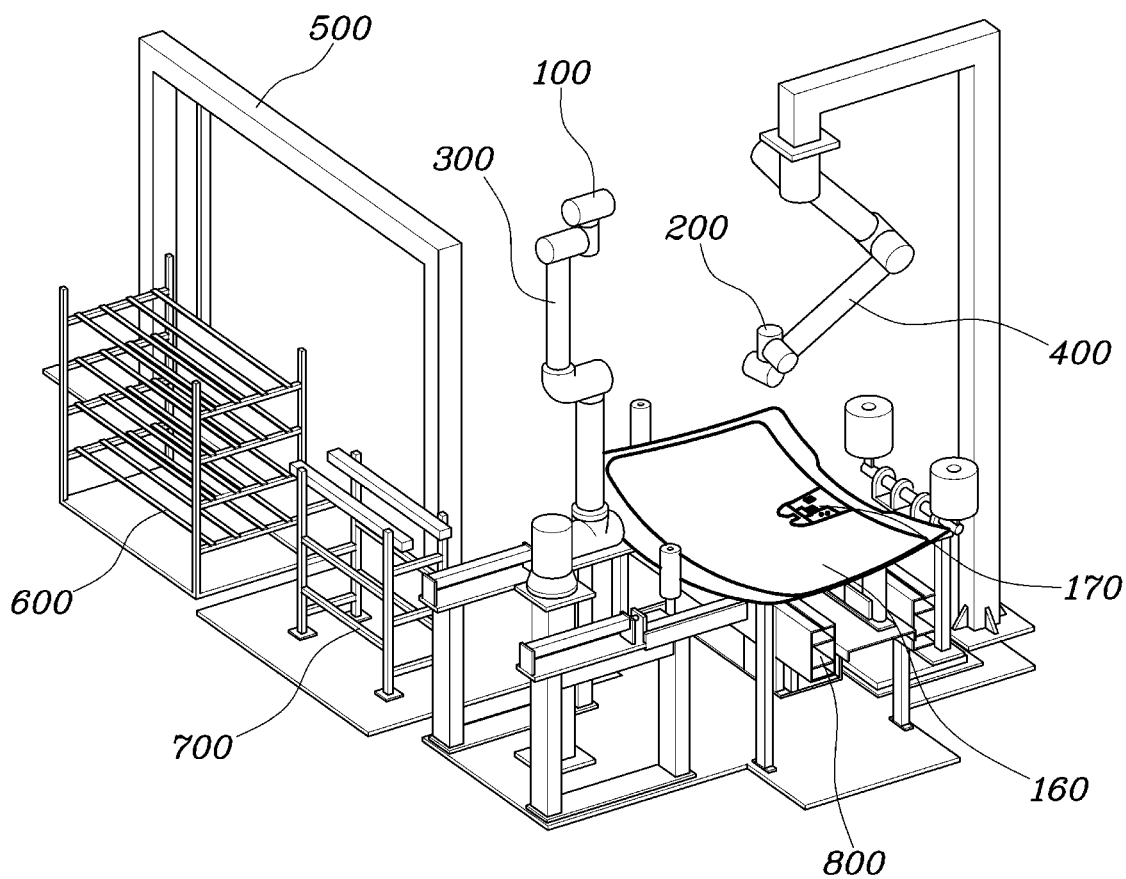
FIG. 1 is a view illustrating a system for assembling an inside mirror for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, eclectic vehicles, plug-in hybrid eclectic vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, the present disclosure will be described in detail through description of preferred embodiments of the present disclosure with reference to the accompanying drawings. Like reference numerals indicated in the respective drawings refer to like members.

Figure 2:
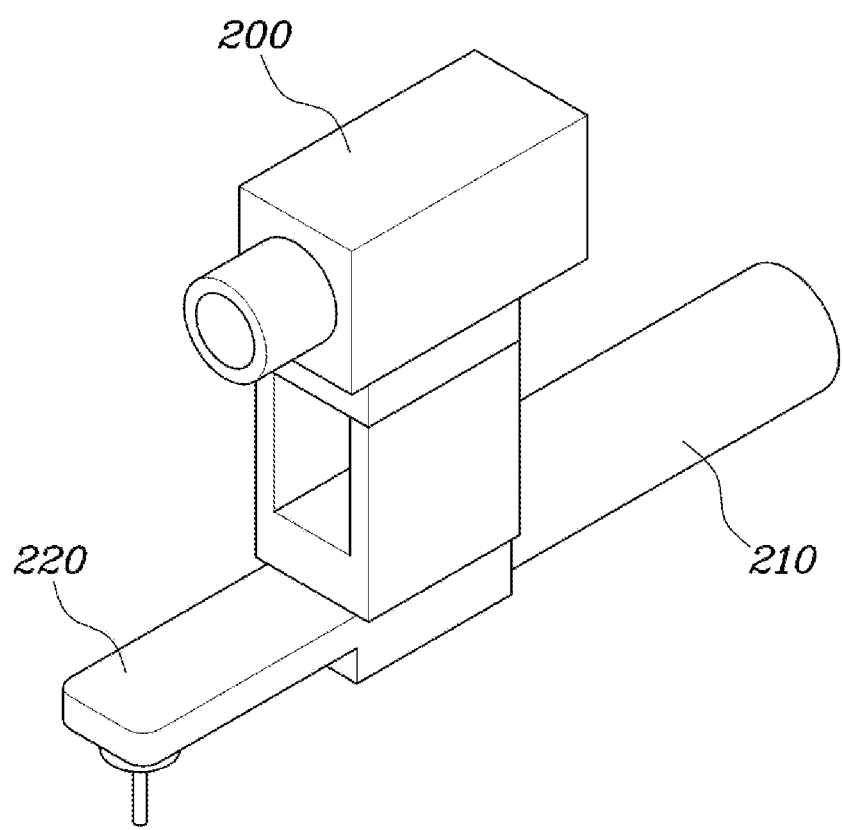
FIG. 2 is a view illustrating a fastening unit and a vision measurement unit disposed at a lateral side of the fastening unit.
Figure 3:
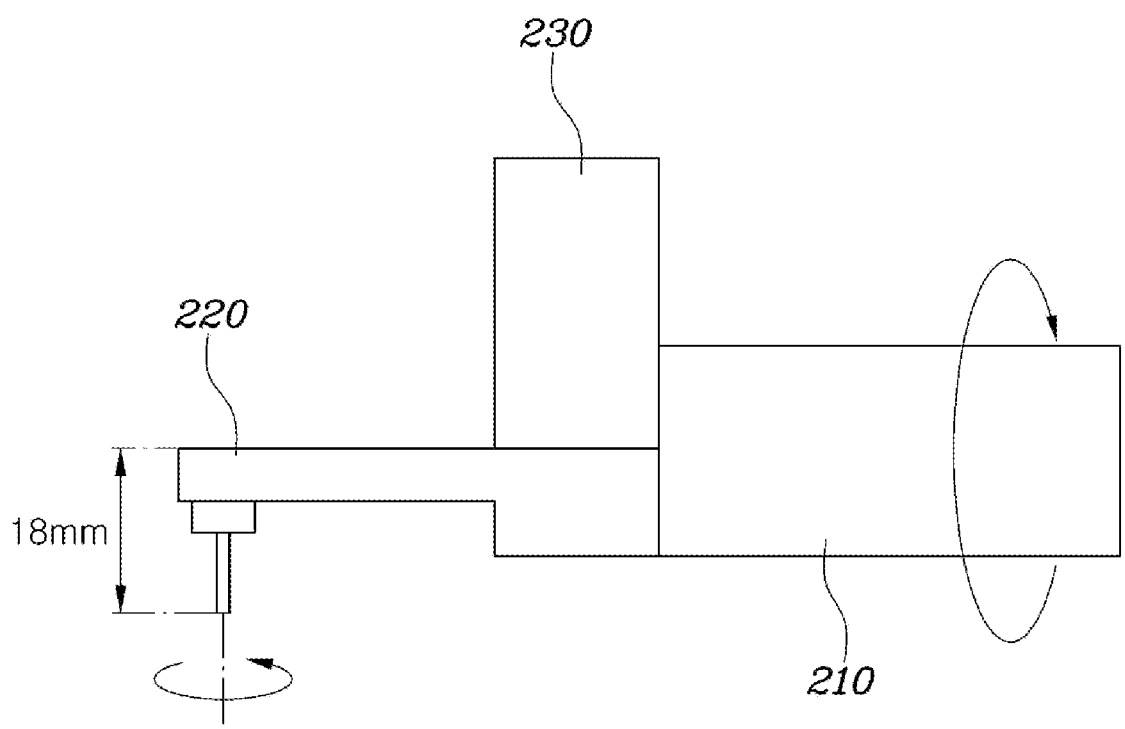
FIG. 3 is a view illustrating the fastening unit designed to be rotatable by a drive motor.
Figure 4:
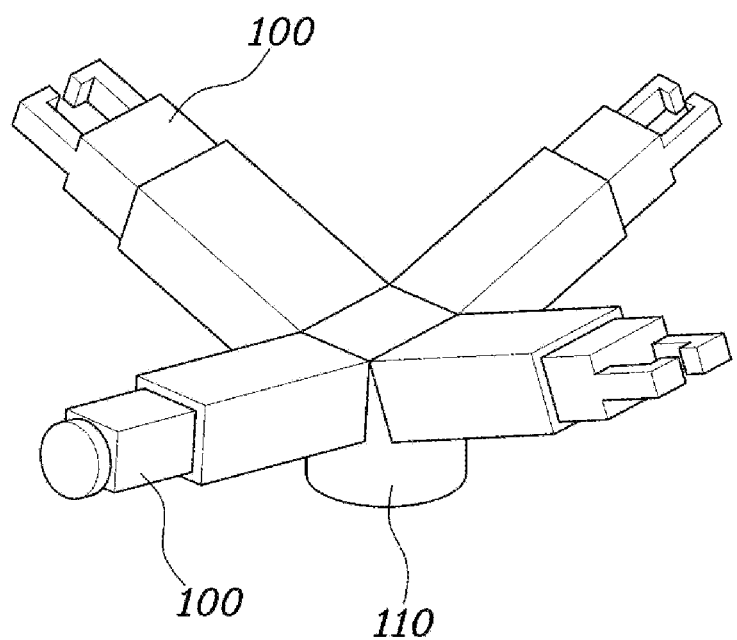
FIG. 4 is a view illustrating a gripper configured to grip an inside mirror for a vehicle.
Figure 5:
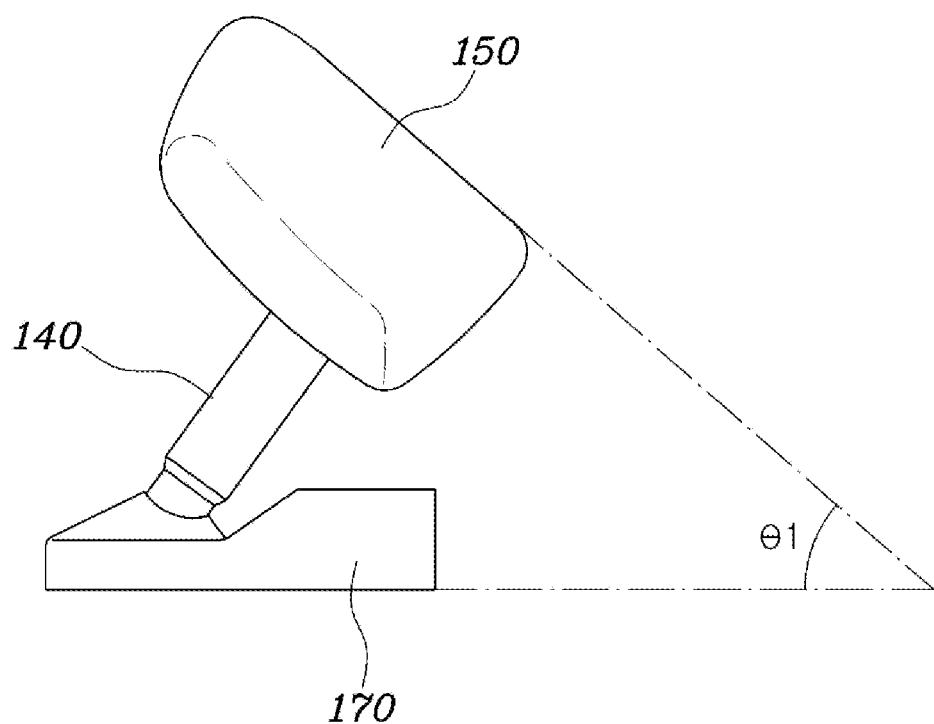
FIGS. 5 and 6 are views illustrating a state in which a control unit uses a vision system and measures measurement information including entry routes, entry angles, and entry directions of first and second mounting surfaces.
Figure 6:
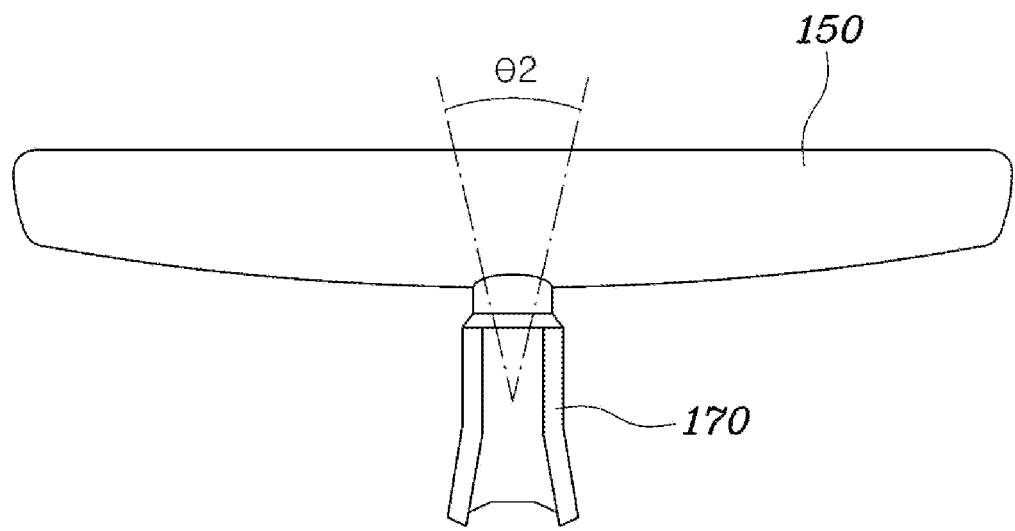

FIG. 1 is a view illustrating a system for assembling an inside mirror for a vehicle according to an embodiment of the present disclosure. FIG. 2 is a view illustrating a fastening unit and a vision measurement unit disposed at a lateral side of the fastening unit. FIG. 3 is a view illustrating the fastening unit designed to be rotatable by a drive motor. FIG. 4 is a view illustrating a gripper configured to grip an inside mirror for a vehicle. FIGS. 5 and 6 are views illustrating a state in which a control unit uses a vision system and measures measurement information including entry routes, entry angles, and entry directions of first and second mounting surfaces. FIG. 7 is a flowchart illustrating a method of managing the system for assembling an inside mirror for a vehicle illustrated in FIG. 1.

FIG. 1 is a view illustrating a system for assembling an inside mirror 150 for a vehicle according to an embodiment of the present disclosure. Referring to FIG. 1, the system for assembling the inside mirror 150 for a vehicle may include: a plurality of robots each having at least one of a vision measurement unit 200, a fastening unit 220, and a gripper 100 configured to grip the inside mirror 150 for a vehicle; and a control unit configured to control the plurality of robots to measure a first mounting surface 170 of a windshield glass 160 and a second mounting surface 140 of the inside mirror 150, move the inside mirror 150 so that the first and second mounting surfaces 170 and 140 are attached to each other while overlapping each other, and fasten the inside mirror 150 and the windshield glass 160 in a state in which the first and second mounting surfaces 170 and 140 are attached to each other.

The present disclosure is characterized in that the process of assembling the inside mirror 150 is automated by measuring assembling postures of atypical components of the windshield glass 160 and the inside mirror 150, thereby improving work organization efficiency and process management efficiency, solving a problem of non-uniformity of an assembling method depending on manual operations, and ensuring uniform component assembling quality.

A method of assembling the inside mirror 150 in the related art is performed by fitting a base of the inside mirror 150 into a base of the windshield glass and fastening and fixing the inside mirror 150 to the windshield glass 160 by screws. Specifically, because pivots attached to the inside mirror 150 and the windshield glass 160 are atypical components, the method of assembling the inside mirror 150 to the windshield glass is inevitably performed manually.

However, the manual operation of assembling the inside mirror is lower in work organization efficiency than a main line, and the inside mirror has an atypical shape due to angles of the two pivots. For this reason, it is difficult to apply a simple pick-and-place assembling method using a robot in the related art.

Therefore, in order to solve the problem that the manual operation of assembling the components has low organization efficiency and it is difficult to apply a simple pick-and-place assembling method using a robot in the related art, assembling postures of the atypical components such as the windshield glass 160 and the pivots attached to the inside mirror 150 may be measured, and the process of assembling the inside mirror 150 may be automated instead of being performed manually, thereby improving process management efficiency.

Specifically, the plurality of robots each may have at least one of the vision measurement unit 200, the fastening unit 220, and the gripper 100 configured to grip the inside mirror 150 for a vehicle. The plurality of robots may have the vision measurement unit 200, the fastening unit 220, and the gripper 100 configured to grip the inside mirror 150 for a vehicle, respectively. Alternatively, the plurality of robots may include: a first robot 300 having an end at which the gripper 100 configured to grip the inside mirror 150 for a vehicle is provided; and a second robot 400 having an end at which the vision measurement unit 200 and the fastening unit 220 are provided.

The vision measurement unit 200 may not be limited as long as the vision measurement unit 200 may measure the first mounting surface 170 of the windshield glass 160 and the second mounting surface 140 of the inside mirror 150 by using a camera. The vision measurement unit 200 may not be limited to the camera. The vision measurement unit 200 may measure the first mounting surface 170 of the windshield glass 160 and the second mounting surface 140 of the inside mirror 150, which are positions to be assembled before the components are assembled. The position at which the windshield glass 160 and the inside mirror 150 are finally assembled may be compensated for on the basis of measurement data.

In addition, after the first mounting surface 170 of the windshield glass 160 and the second mounting surface 140 of the inside mirror 150 are attached to each other while overlapping each other, the vision measurement unit 200 may measure a position of the fastening unit 220 on the basis of the measured positions, and the fastening unit 220 may fix the inside mirror 150 to the windshield glass 160. FIG. 3 illustrates the fastening unit 220 designed to be rotatable by a drive motor 210. The fastening unit 220 and the gripper 100 may be designed to be rotatable.

A rotation direction change gear 230 may be provided between the fastening unit 220 and the vision measurement unit 200, such that the fastening unit 220 may be rotated. Because both the inside mirror 150 and the windshield glass 160 have atypical shapes, the entry of the fastening unit 220 is advantageously performed by the configuration in which the fastening unit 220 is rotated. As a result, since the entry of the fastening unit 220 is advantageously performed, the operation of assembling the inside mirror 150 may be automated instead of being performed manually. Likewise, the gripper 100 may also be designed to be rotatable for automation so that the first mounting surface 170 of the windshield glass 160 and the second mounting surface 140 of the inside mirror 150, which have atypical shapes, are attached to each other while overlapping each other.

In addition, the gripper 100 configured to grip the inside mirror 150 for a vehicle may be provided at the end of the first robot 300. As illustrated in FIG. 4, the grippers 100 may be provided on an upper portion of a multi-tool mount unit 110 and include three pneumatic grippers 100 (for the inside mirror 150, DVRS, and MFC) and one magnetic gripper 100 (for a rain sensor). In addition, the functions of the multi-tool mount unit 110 may be changed by rotating the robot about six axes.

Likewise, the vision measurement unit 200 and the fastening unit 220 may be provided at the end of the second robot 400. The vision measurement unit 200 measures and compensates for the position of the fastening unit 220 by recognizing in real time the position measured by the vision measurement unit 200, thereby allowing the fastening unit 220 to fix the inside mirror 150 to the windshield glass 160.

Specifically, the first robot 300 has a shape of a standard articulated robot, and the second robot 400 may have a shape of a shelf-mounted articulated robot. All the multiple robots include a plurality of links and a plurality of joints. The first robot 300 having a shape of the standard articulated robot shape is supported at the lower side, and the second robot 400 having a shape of the shelf-mounted articulated robot is supported at the upper side.

Schematically, the inside mirror 150 may be disposed on a component-dedicated palette 600. The component is transferred to a transfer/loading device 700 by a component supply device 500 which is a three-axis gantry system for supplying the component. The gripper 100 connected to the end of the first robot 300 grips the inside mirror 150 from the transfer/loading device 700. In addition, during the operation, the vision measurement unit 200 of the second robot 400 measures the first mounting surface 170 and the second mounting surface 140 of the inside mirror 150 above a working stage 800 so that the first mounting surface 170 and the second mounting surface 140 are attached to each other while overlapping each other. On the basis of the measurement information measured by the vision measurement unit 200, the fastening unit 220 may fasten the first and second mounting surfaces 170 and 140 while compensating for entry routes, entry angles, and entry directions of the first and second mounting surfaces 170 and 140. The fastening unit 220 may have a small-scale adapter shape, i.e., a thin, long shape.

Specifically, the working stage 800 may have units for supporting the windshield glass 160, aligning the components, and fixing the component. The control unit controls the plurality of robots above the working stage 800 and measures the first mounting surface 170 of the windshield glass 160 and the second mounting surface 140 of the inside mirror 150. The working stage 800 may have a shape extending downward at multiple angles so as to support the windshield glass 160.

In addition, referring to FIGS. 5 and 6, the control unit may use the vision system and measure the measurement information including the entry routes, the entry angles, and the entry directions of the first and second mounting surfaces 170 and 140. Therefore, the control unit may measure the measurement information including the entry routes, the entry angles, and the entry directions of the first and second mounting surfaces 170 and 140.

Specifically, the control unit may control the plurality of robots to allow the vision measurement unit 200 to measure the first mounting surface 170 of the windshield glass 160 and the second mounting surface 140 of the inside mirror 150 and moves the inside mirror 150 so that the first and second mounting surfaces 170 and 140 are attached to each other while overlapping each other. In addition, the control unit may compensate for the entry routes, the entry angles, and the entry directions of the first and second mounting surfaces 170 and 140 on the basis of the measurement information measured by the vision measurement unit 200 and accurately measure the position on the basis of the compensated data, such that the fastening unit 220 may completely fix the first and second mounting surfaces 170 and 140. As illustrated in the accompanying drawings, angles in a y-axis direction and a z-axis direction with respect to the first mounting surface 170 may be measured and compensated as the entry angle.

In addition, when the first and second mounting surfaces 170 and 140 are attached to each other, the control unit may adjust the angle of the inside mirror 150 so that the inside mirror 150 and the windshield glass 160 are parallel to each other. To ensure the entry section of the fastening unit 220 and uniform component assembling quality, the angle may be adjusted by tilting the first robot 300 so that the windshield glass 160 and the inside mirror 150 are parallel to each other in the state in which the first mounting surface 170 of the windshield glass 160 and the second mounting surface 140 of the inside mirror 150 are attached to each other.

Next, FIG. 7 is a flowchart illustrating a method of managing the system for assembling the inside mirror 150 for a vehicle illustrated in FIG. 1. Referring to FIG. 7, the method of assembling the inside mirror 150 for a vehicle includes: measuring the first mounting surface 170 of the windshield glass 160 and the second mounting surface 140 of the inside mirror 150 (S50); assembling the inside mirror 150 so that the first and second mounting surfaces 170 and 140 are attached to each other while overlapping each other (S70); and performing control to fasten the inside mirror 150 and the windshield glass 160 in the state in which the first and second mounting surfaces 170 and 140 are attached to each other (S60).

Because detailed technical features in the respective steps of the method of assembling the inside mirror 150 for a vehicle according to the present disclosure are identical or similar to the technical features of the respective configurations of the above-mentioned system for assembling the inside mirror 150 for a vehicle according to the present disclosure, a detailed description thereof will be omitted.

Specifically, the measuring of the first mounting surface 170 of the windshield glass 160 and the second mounting surface 140 of the inside mirror 150 (S50) may include measuring the measurement information including the entry routes, the entry angles, and the entry directions of the first and second mounting surfaces 170 and 140.

In addition, the method may further include disposing the windshield glass 160 on the working stage 800 to support the windshield glass 160 (S10) before the measuring of the first mounting surface 170 of the windshield glass 160 and the second mounting surface 140 of the inside mirror 150 (S50).

In addition, the method may further include gripping the inside mirror 150 (S20) after the disposing of the windshield glass 160 (S10).

In addition, the method may further include fixing the windshield glass 160 (S30) and gripping the inside mirror 150 (S40) after the disposing of the windshield glass 160 (S10).

In addition, the method may further include compensating for the entry routes, the entry angles, and the entry directions of the first and second mounting surfaces 170 and 140 (S90) after the assembling of the inside mirror 150 (S70).

In addition, the method may further include adjusting the angle of the inside mirror 150 so that the inside mirror 150 and the windshield glass 160 are parallel to each other (S80) after the assembling of the inside mirror 150 (S70).

According to the system and method for assembling an inside mirror for a vehicle according to the present disclosure, it is possible to automate the process of assembling the inside mirror by developing the fastening tool used in a narrow space and compensating for the assembling position of the robot by measuring the assembling postures of the atypical components of the windshield glass and the inside mirror, thereby improving work organization efficiency and process management efficiency, solving a problem of non-uniformity of an assembling method depending on manual operations, and ensuring uniform component assembling quality.

While the specific embodiments of the present disclosure have been illustrated and described, it will be obvious to those skilled in the art that the present disclosure may be variously modified and changed without departing from the technical spirit of the present disclosure defined in the appended claims.

DESCRIPTION OF REFERENCE NUMERALS

100: Gripper
110: Multi-tool mount unit
140: Second mounting surface
150: Inside mirror
160: Windshield glass
170: First mounting surface
200: Vision measurement unit
210: Drive motor
220: Fastening unit
230: Rotation direction change gear
300: First robot
400: Second robot
500: Component supply device
600: Component-dedicated palette
700: Transfer/loading device
800: Working stage

What is claimed is:

1. A system for assembling an inside mirror for a vehicle, the system comprising:
a plurality of robots each having at least one of a vision measurement unit, a fastening unit, and a gripper configured to grip an inside mirror for a vehicle; and
a control unit configured to control the plurality of robots to measure a first mounting surface of a windshield glass and a second mounting surface of the inside mirror, move the inside mirror so that the first and second mounting surfaces are attached to each other while overlapping each other, and fasten the inside mirror and the windshield glass in a state in which the first and second mounting surfaces are attached to each other.

2. The system of claim 1, wherein the plurality of robots comprises:
a first robot having an end at which the gripper configured to grip the inside mirror for a vehicle is provided; and
a second robot having an end at which the vision measurement unit and the fastening unit are provided.

3. The system of claim 2, wherein the first robot has a shape of a standard articulated robot, and the second robot has a shape of a shelf-mounted articulated robot.

4. The system of claim 1, wherein the fastening unit and the gripper are configured to be rotatable.

5. The system of claim 1, wherein the fastening unit is rotatable by a drive motor.

6. The system of claim 1, wherein the control unit is configured to measure measurement information comprising entry routes, entry angles, and entry directions of the first and second mounting surfaces.

7. The system of claim 6, wherein the control unit is configured to compensate for the entry routes, the entry angles, and the entry directions of the first and second mounting surfaces on the basis of the measurement information.

8. The system of claim 7, wherein the fastening unit is configured to fasten the first and the second mounting surfaces while compensating for the entry routes, the entry angles, and the entry directions of the first and second mounting surfaces on the basis of the measurement information.

9. The system of claim 1, wherein the control unit is configured to adjust an angle of the inside mirror so that the inside mirror and the windshield glass are parallel to each other when the first and second mounting surfaces are attached to each other.

10. The system of claim 1, further comprising:
a working stage configured to support the windshield glass, align components, and fix the components,
wherein the control unit is configured to control the plurality of robots above the working stage and measure the first mounting surface of the windshield glass and the second mounting surface of the inside mirror.

11. The system of claim 1, wherein the gripper is provided on an upper portion of a multi-tool mount unit and/or includes three pneumatic grippers and one magnetic gripper.

* * * * *